United States Patent Office 3,190,849
Patented June 22, 1965

3,190,849
COMPOSITIONS COMPRISING A VINYLIDENE HALIDE RESIN PLASTICIZED WITH AN ALKYL XYLYL SULFONE
John Robert Campbell, Creve Coeur, and Roger E. Hatton, Kirkwood, Mo., assignors to Monsanto Company, a corporation of Delaware
No Drawing. Original application July 8, 1960, Ser. No. 41,485, now Patent No. 3,102,148, dated Aug. 27, 1963. Divided and this application Oct. 31, 1962, Ser. No. 234,855
5 Claims. (Cl. 260—30.8)

This application is a division of application, Serial No. 41,485, filed July 8, 1960, now Patent No. 3,102,148.

This invention relates to alkyl xylyl sulfones in which the alkyl group has from 8 to 14 carbon atoms and to vinylidene halide resin compositions containing said sulfones as plasticizers therefor.

The preparation of typical alkyl xylyl sulfones of this invention is illustrated in the following non-limiting examples. Parts are parts by weight unless otherwise stated.

EXAMPLE 1

Into a suitable reaction vessel fitted with a distillation column and reflux condenser and having means for the addition and removal of solids and liquids, means for measuring the temperature of the vessel contents, means for agitating the vessel contents and means for the addition and removal of heat, there was charged 8.0 parts of sodium hydroxide dissolved in absolute ethanol. 27.6 parts of a commercial mixture of thioxylenols (B.P. 210–220° C.; sp. gr. 25°/4° C. 1.026; ref. index, $n_D^{25°}$ 1.5696) was added rapidly while cooling the reaction mass so as to maintain its temperature at about 25° C. After completing the addition of the thioxylenol, the reaction mixture was cooled to 10–15° C. and 38.6 parts of n-octyl bromide was added while maintaining the reaction mass temperature below about 15° C. Thereafter the reaction mass was agitated for about one hour during which time the temperature of said mass was allowed to come to room temperature. The reaction mixture was then heated for about 3 hours at a temperature sufficient to maintain reflux and the ethanol was distilled. The residue remaining after the distillation was diluted with water and the organic material was extracted with ether and dried. Vacuum distillation of the residue gave 47.2 parts of octyl xylyl sulfide, B.P. 130–131° C./0.6 mm.

Thereafter 45.8 parts of n-octyl xylyl sulfide prepared above was dissolved in 200 ml. of glacial acetic acid. About 61 ml. of 30% hydrogen peroxide was then slowly added and the resulting mixture was heated for about 4 hours at temperatures of 65–75° C. After the heating period, the reaction mass was poured into cold water and the organic material was removed by extraction with chloroform. The chloroform solution was then washed with dilute sodium hydroxide and then with water. Thereafter the solution was dried, the chloroform removed by evaporation and the residue distilled under vacuum to yield 49.7 parts of n-octyl xylyl sulfone, a practically colorless oil having a boiling point of 174–176° C. at 0.8 mm. of mercury.

EXAMPLE 2

Into a suitable reaction vessel (as described in Example 1) there was charged 8.0 parts of sodium hydroxide dissolved in 200 ml. of absolute ethanol. 27.6 parts of a commercial mixture of thioxylenols (characterized in Examyle 1) were added rapidly while cooling the reaction mass so as to maintain its temperature at about 25° C. Thereafter the reaction mass was cooled to 10–15° C. and 46.6 parts of n-tetradecyl chloride was added while maintaining the reaction mass temperature below about 15° C. The reaction mass was then agitated for about 1 hour during which time the temperature of said mass was allowed to come to room temperature. The reaction mixture was then heated at reflux conditions for about 8 hours. The reaction mass was then distilled to remove ethanol and the residue from the distillation was diluted with water extracted with ether and dried. Vacuum distillation of the dried extract yielded 61.8 parts of n-tetradecyl xylyl sulfide, a light yellow oil, B.P. 175–180° C./0.3 mm.

Thereafter 61.0 parts of tetradecyl xylyl sulfide prepared above was dissolved in 100 ml. of glacial acetic acid. About 60 ml. of 30% hydrogen peroxide was then slowly added and the resulting mixture was heated for about 4 hours at temperature of 65–75° C. After the heating period, the reaction mass was poured into cold water and the organic layer was removed by extraction with chloroform. The chloroform solution was then washed with dilute sodium hydroxide and then with water. Thereafter the solution was dried, the chloroform removed by evaporation and the residue distilled under vacuum to yield 63.0 parts of tetradecyl xylyl sulfone, a light yellow oil having a boiling point of 207–212° C./0.25 mm.

In a similar manner, other alkyl xylyl sulfones of this invention can be prepared, examples of which are 2-ethylhexyl xylyl sulfone, isooctyl xylyl sulfone, nonyl xylyl sulfone, n-decyl xylyl sulfone, isodecyl xylyl sulfone, undecyl xylyl sulfone, dodecyl xylyl sulfone, tridecyl xylyl sulfone and the like.

As heretofore mentioned, the alkyl xylyl sulfones of this invention are particularly useful as plasticizers for vinylidene halide resin compositions. As indicative of the properties of such compositions, comparitive tests were conducted on several vinylidene halide resin compositions prepared by plasticizing polyvinyl chloride with an alkyl xylyl sulfone. Also similar compositions were prepared using dioctyl phthalate in order to provide a basis for comparison. The properties compared and the test methods used for the comparison were as follows:

Low temperature flexibility—ASTM Method D1043–51.
Volatility—ASTM Method D1203–52T.
Hydrocarbon extraction—ASTM Method D543–52T.
Shore hardness—ASTM Method D676–58T.

The results observed utilizing the above tests are listed below in Table I. In each case test samples were prepared using 40 parts of plasticizer for each 100 parts of polyvinyl chloride resin. In order to prepare the test samples the plasticizer was worked with the resin on a differential speed roll mill having one roll at a higher temperature than the other roll until a homogeneous plasticized composition having a thickness of 40 mills was formed. The test samples were then taken from the plasticized sheets.

Table I

| Plasticizer | Low Temperature Flexibility Point, °C. | Volatility, Percent Pasticizer Lost | Hydrocarbon Extraction, Percent Plasticizer Lost | Shore Hardness, "A" |
|---|---|---|---|---|
| Dioctyl phthalate | −37 | 4.5 | 80 | 73 |
| n-Octyl xylyl sulfone | −32 | 14.6 | 15 | 65 |
| n-Tetradecyl xylyl sulfone | −25 | 1.9 | 5.4 | 69 |

As is evident from the above, the alkyl xylyl sulfones wherein the alkyl group has from 8 to 14 carbon atoms provide outstandingly permanent plastic compositions when used as plasticizers for vinylidene halide resins and are superior even to dioctyl phthalate, which is the standard of the industry.

As used herein, the term "vinylidene halide" is intended to include vinylidene compounds such as vinylidene chloride and vinyl chloride, and the term "vinylidene halide resin" is intended to include polymers of vinylidene compounds such as vinyl chloride, vinylidene chloride, etc., and copolymers of such vinylidene compounds with other ethylenically unsaturated monomers copolymerizable therewith, as copolymers of vinyl chloride or vinylidene chloride with such materials as vinyl esters of carboxylic acids, e.g., vinyl acetate, vinyl propionate, vinyl butyrate and vinyl benzoate; esters of unsaturated acids, e.g. alkyl acrylates, as methyl acrylate, ethyl acrylate, propyl acrylate, butyl acrylates and the corresponding alkyl esters of methacrylic and ethacrylic acids; vinyl aromatic compounds, e.g. styrene, ortho- and para-chloro styrene, the dichloro styrenes, as 2,5-dichloro styrene, divinyl benzene, vinyl naphthalene, alpha-methyl styrene; unsaturated amides, e.g. acrylic acid amides, acrylic acid anilide; unsaturated nitriles, e.g. acrylonitrile, methacrylonitrile; $\alpha,\beta$-ethylenically unsaturated dicarboxylic acids, e.g. the methyl, ethyl propyl, butyl, tert.-butyl, amyl, hexyl, octyl, decyl, dodecyl, tridecyl, allyl, methallyl, phenyl, alkyl phenyl and phenalkyl monoesters and diesters of maleic itaconic and fumaric acids, and the like. Such copolymers should contain at least 50% by weight and preferably 70% by weight of a vinylidene halide. A preferred class of polymers or resins are those in which a predominant proportion, i.e. about 70% by weight, of the monomer units are vinyl chloride units any balance being monomer units derived from an ethylenically unsaturated monomer.

In addition to the above described vinylidene halide polymers, similar polymers and copolymers wherein the vinylidene chloride or vinyl chloride is replaced in whole or part by other vinylidene halides can be utilized. Typical of such other vinylidene halides are vinyl bromide, vinylidene bromide, vinyl iodide, and vinyl fluoride.

Although the quantity of plasticizer used will depend upon the particular polymer or copolymer to be plasticized and its intended use, compositions containing from about 25 to about 300 parts of plasticizer per 100 parts of resin can be used since the alkyl xylyl sulfones can be used for making rigid plastic products as well as flexible products, e.g. plastisols. It can thus be said that the plasticizers will be used in a plasticizing amount.

Other modes of applying the principles of this invention will be apparent to those skilled in the art. Accordingly, while this invention has been described by reference to various specific examples and embodiments, it is to be understood that the invention is not limited thereto and that it can be variously practiced within the scope of the following claims.

The embodiments of the invention in which an exclusive property or privilege is claimed are defined as follows:

1. A composition comprising a vinylidene halide resin wherein at least about 70% by weight of the monomer units are vinylidene halide units any balance being monomer units derived from an ethylenically unsaturated monomer copolymerizable therewith and a plasticizing amount of an alkyl xylyl sulfone wherein the alkyl group contains from 8 to 14 carbon atoms.

2. A composition of claim 1 where the vinylidene halide resin is a polyvinylidene chloride.

3. A composition comprising polyvinyl chloride and a plasticizing amount of an alkyl xylyl sulfone wherein the alkyl group contains from 8 to 14 carbon atoms.

4. A composition of claim 3 where the alkyl xylyl sulfone is n-octyl xylyl sulfone.

5. A composition of claim 3 where the alkyl xylyl sulfone is n-tetradecyl xylyl sulfone.

References Cited by the Examiner

UNITED STATES PATENTS 2,127,400   8/38   Gibbs _____ 260—30.8

MORRIS LIEBMAN, *Primary Examiner.*